United States Patent
Huang

(10) Patent No.: US 7,446,485 B2
(45) Date of Patent: Nov. 4, 2008

(54) MULTI-LAMP DRIVING SYSTEM

(75) Inventor: Shih-Chung Huang, Taipei (TW)

(73) Assignee: Beyond Innovation Technology Co., Ltd., Taipei (TW)

( * ) Notice: Subject to any disclaimer, the term of this patent is extended or adjusted under 35 U.S.C. 154(b) by 150 days.

(21) Appl. No.: 11/210,534

(22) Filed: Aug. 24, 2005

(65) Prior Publication Data

US 2007/0052370 A1    Mar. 8, 2007

(51) Int. Cl.
*H05B 41/16* (2006.01)
(52) U.S. Cl. .......................... 315/277; 315/291
(58) Field of Classification Search ............. 315/209 R, 315/246, 254–256, 276–279, 291, 307–308, 315/312; 345/102, 204
See application file for complete search history.

(56) References Cited

U.S. PATENT DOCUMENTS

| | | | | |
|---|---|---|---|---|
| 5,396,155 A * | 3/1995 | Bezdon et al. | ............... | 315/291 |
| 7,166,969 B2 * | 1/2007 | Kohno | ................... | 315/209 PZ |
| 7,242,147 B2 * | 7/2007 | Jin | .............................. | 315/177 |
| 7,242,151 B2 * | 7/2007 | Chan et al. | ................... | 315/278 |
| 2004/0155596 A1 * | 8/2004 | Ushijima et al. | ............. | 315/224 |
| 2005/0093472 A1 * | 5/2005 | Jin | .............................. | 315/177 |
| 2005/0105305 A1 * | 5/2005 | Sawada et al. | ................. | 363/34 |
| 2005/0184684 A1 * | 8/2005 | Matsushima et al. | ......... | 315/312 |
| 2005/0225261 A1 * | 10/2005 | Jin | .............................. | 315/255 |
| 2005/0285548 A1 * | 12/2005 | Moyer et al. | ................. | 315/312 |
| 2006/0028147 A1 * | 2/2006 | Shinmen et al. | .......... | 315/209 R |
| 2006/0132059 A1 * | 6/2006 | Tanaka et al. | ................ | 315/277 |
| 2006/0232228 A1 * | 10/2006 | Lee | .............................. | 315/308 |
| 2006/0244395 A1 * | 11/2006 | Taipale et al. | ................ | 315/277 |

* cited by examiner

*Primary Examiner*—David Hung Vu
*Assistant Examiner*—Tung X Le
(74) *Attorney, Agent, or Firm*—Jianq Chyun IP Office

(57) ABSTRACT

A multi-lamp driving system for driving a first lamp and a second lamp includes a power supply circuit, and first-stage transformers. The power supply circuit is used for supplying the first and second lamps with an AC power, and first-stage transformers coupled to the power supply circuit for performing an impedance-matching function to balance lamp currents and deliver evenly distributed current to each lamp in the multi-lamp system so that each lamp provides approximately same amount of luminance. The first-stage transformers includes a first transformer have a primary side coupled to the power supply circuit and a secondary side coupled to the first lamp, and a second transformer have a primary side coupled to the first transformer and a secondary side coupled to the second lamp.

9 Claims, 6 Drawing Sheets

MULTI-LAMP DRIVING SYSTEM

BACKGROUND OF THE PRESENT INVENTION

1. Field of Invention

The present invention relates to a multi-lamp driving system for driving fluorescent lamps, such as, for example, cold cathode fluorescent lamps (CCFLs), and more particularly to the drive topology of such circuits.

2. Description of Related Arts

Fluorescent lamps are used to provide illumination for general lighting purposes. The critical factors in the design of a cold cathode fluorescent lamp (CCFL) include efficiency, cost, and size. CCFLs (cold cathode fluorescent lamps) are wildly employed in display panels as a backlight. Generally speaking, CCFLs require approximately 1500 Volts (RMS) to strike, and require approximately 800 Volts (RMS) for steady state operation. In displays where two CCFLs are required, a conventional technique is couple the lamps in parallel with the secondary side of a step-up transformer. In multi-lamp system, the conventional technique for driving the lamps is to couple the lamps together in parallel with one another to the transformer. While this ensures, voltage control during striking, this topology also requires impedance matching circuitry for the lamps. Also, current control in this topology is difficult since the current conditions of each lamp must be monitored.

FIG. 1 shows a conventional dual lamp circuit having two CCFLs coupled in parallel, which includes a DC power supply 101, a DC/AC converter 102, a step-up transformer 103, an impedance matching network 104, a first CCFLs 105, and a second CCFL 106. The DC/AC converter 102 could be any one type of a full-bridge circuit, a half-bridge circuit, a push-pull circuit or a Royer circuit. The power supply 101 is coupled to the input of the DC/AC converter 102. In other words, the power supply 101 provides DC power to the DC/AC converter 102. The DC/AC converter 102 converts the DC power to AC power. The AC power is used to supply to a primary side of the step-up transformer 103. A secondary side of the step-up transformer 103 is coupled to the impedance matching network 104. The impedance matching network 104 comprises a high voltage inductor and two high voltage capacitors to deliver distributed current to each CCFL. However, it is hard to design appropriate an inductance of the inductor and capacitances of two high voltage capacitors in order to deliver evenly distributed current to each CCFL. Furthermore, in a multi-lamp system, the system needs more inductors to achieve the current s to deliver distributed current to each CCFL and consequently cause the complexity in design.

FIG. 2 shows another conventional driving circuit for driving a plurality of cold cathode fluorescent lamps. DC power 201 is supplied to a DC/AC converter 202. The DC/AC converter 202 converts the DC power to AC power, wherein the DC/AC converter 202 could be any one type of a full-bridge circuit a half-bridge circuit, a push-pull circuit or a Royer circuit. The AC power is used to supply to a primary side of the step-up transformer 203. The secondary winding of the transformer 203 is coupled to three cold cathode fluorescent lamps 207, 209, and 209 through three high voltage capacitors 204, 205, and 206, respectively. Any adjacent two cold cathode fluorescent lamps are connected to a corresponding common-mode choke CC.sub.1 to CC.sub.2. In other words, when the DC/AC converter circuit structure of the present invention is used to drive a plurality of cold cathode fluorescent lamps, the number of used common-mode chokes used is less than the number of the driven cold cathode fluorescent lamps by one. The common-mode choke balances the current flowing through each lamp so that each lamp provides same amount of luminance, as is described in U.S. Pat. No. 6,781, 325. However, there are many drawbacks in the conventional driving circuit. For example, in order to implement open circuit protection of a CCFL, the prior art generally utilizes a series resistor connected to the lower voltage side of the lamp to detect a lamp current, however, it is difficult to achieve an open circuit protection of a cold cathode fluorescent lamp because there exists an induced voltage across the series resistor whether the lamp current passes through the CCFL or not. In other words, there exists an induced voltage across the series resistor even though the CCFL is open. Therefore, it is difficult to detect whether the CCFL is under normal operation or not. Furthermore, when the CCFL is open, there exists an induced high voltage across one of the windings of the common-mode choke because the common-mode choke will try to balance the current flowing through each lamp. Therefore, the induced high voltage probably harms the common-mode choke or the peripheral circuits.

SUMMARY OF THE PRESENT INVENTION

A main object of the present invention is to provide a multi-lamp driving system that utilizes two stage transformers to step up the voltage for driving a plurality of cold cathode fluorescent lamps (CCFLs), wherein the second-stage transformer performs the voltage step-up function and filtering function to provide a higher voltage to the first-stage transformers and the first-stage transformers performing an impedance-matching function to balance lamp currents and deliver evenly distributed current to each lamp in the multi-lamp system so that each lamp provides approximately same amount of luminance.

Accordingly, in order to accomplish the one or some or all above objects, the present invention provides a multi-lamp driving system for driving a first lamp and a second lamp, comprising:

a power supply circuit for supplying the first and second lamps with an AC power; and first-stage transformers coupled to the power supply circuit for performing an impedance-matching function to balance lamp currents and deliver evenly distributed current to each lamp in the multi-lamp system so that each tamp provides approximately same amount of luminance, wherein the first-stage transformers comprises:

a first transformer have a primary side coupled to the power supply circuit and a secondary side coupled to the first lamp; and a second transformer have a primary side coupled to the first transformer and a secondary side coupled to the second lamp.

One or part or all of these and other features and advantages of the present invention will become readily apparent to those skilled in this art from the following description wherein there is shown and described a preferred embodiment of this invention, simply by way of illustration of one of the modes best suited to carry out the invention. As it will be realized, the invention is capable of different embodiments, and its several details are capable of modifications in various, obvious aspects all without departing from the invention.

Accordingly, the drawings and descriptions will be regarded as illustrative in nature and not as restrictive.

DETAILED DESCRIPTION OF THE PREFERRED EMBODIMENT

Figure 1:
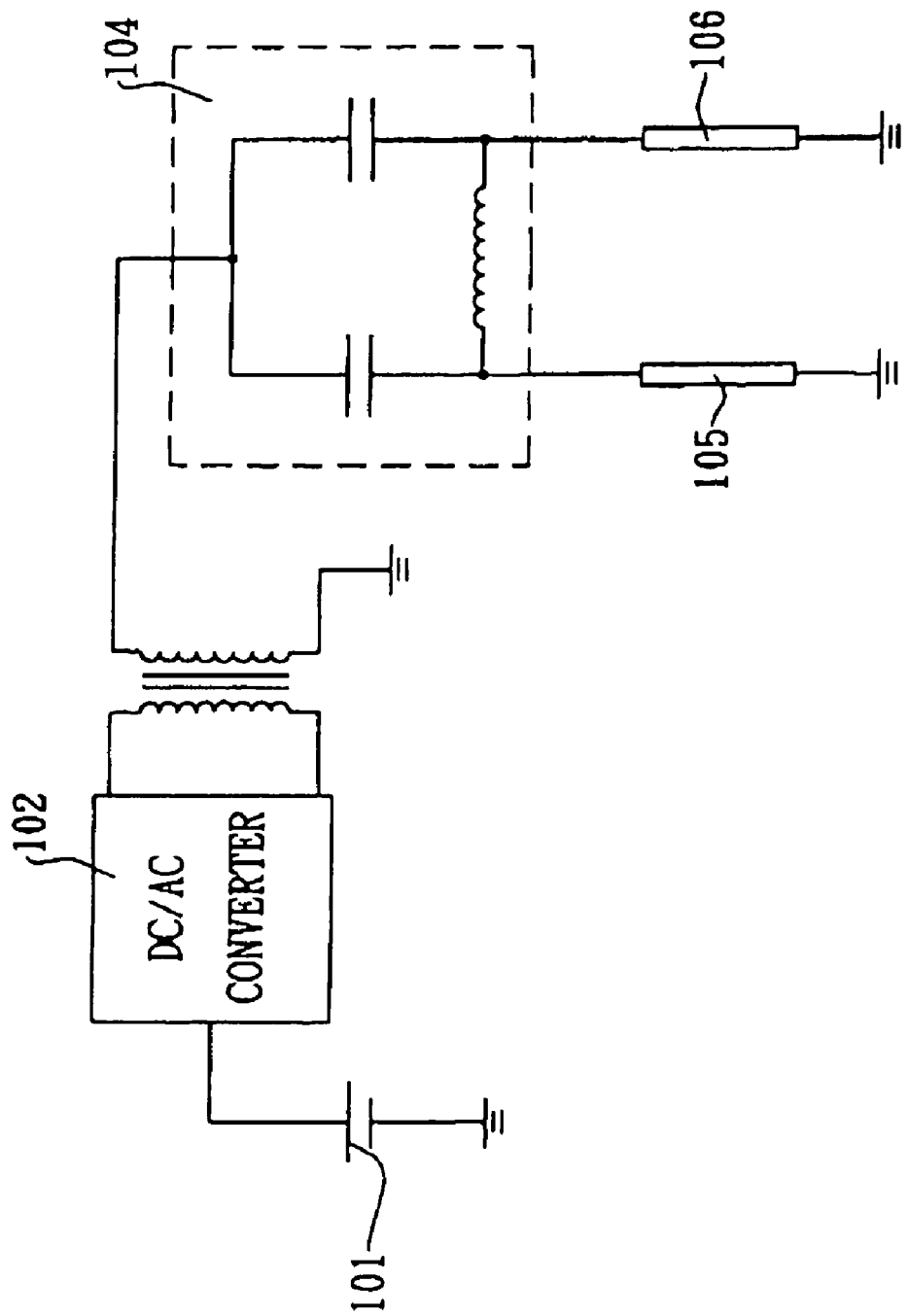
FIG. 1 is a schematic diagram of a conventional dual lamp circuit having two CCFLs coupled in parallel.
Figure 2:
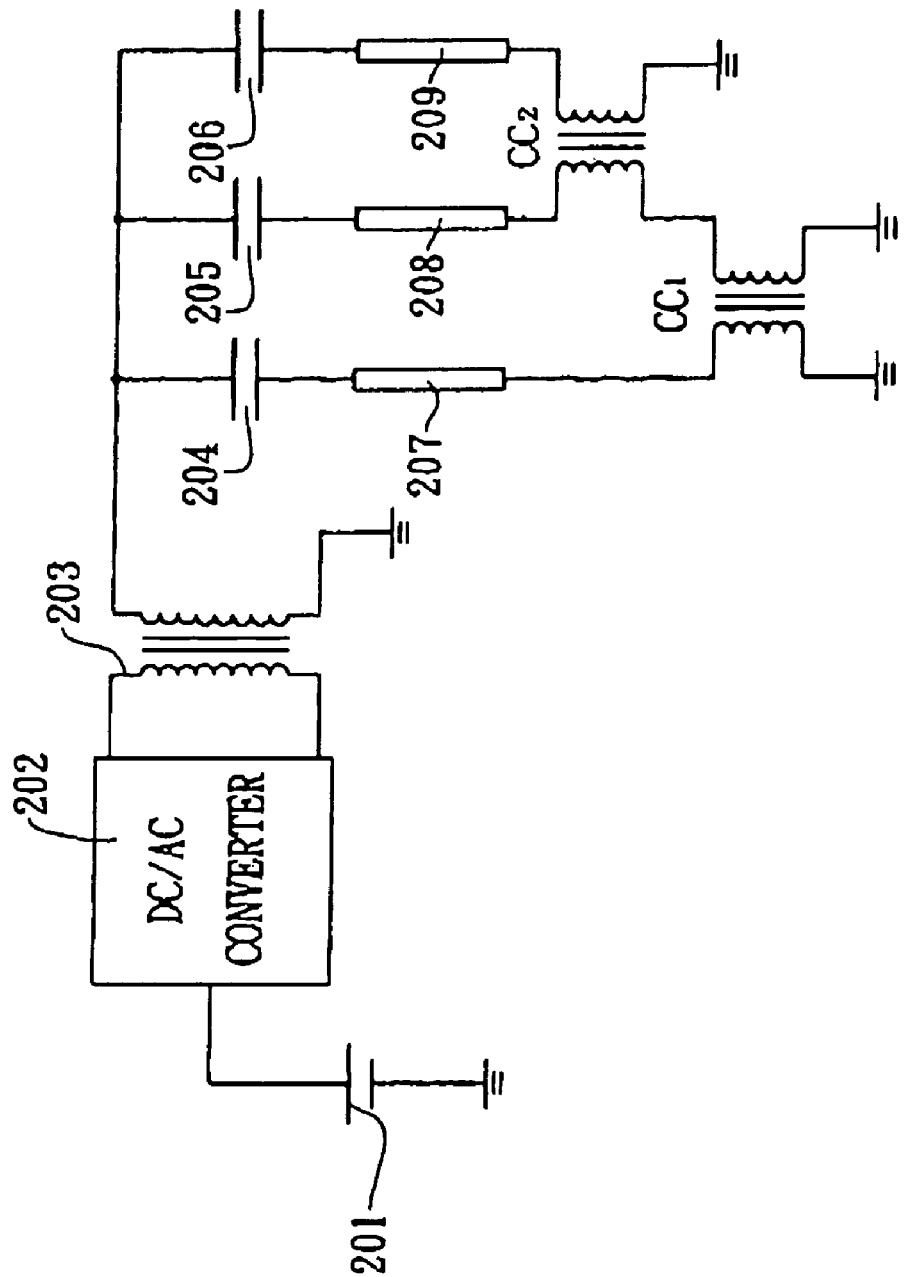
FIG. 2 is a schematic diagram of another conventional driving circuit for driving a plurality of cold cathode fluorescent lamps.
Figure 3:
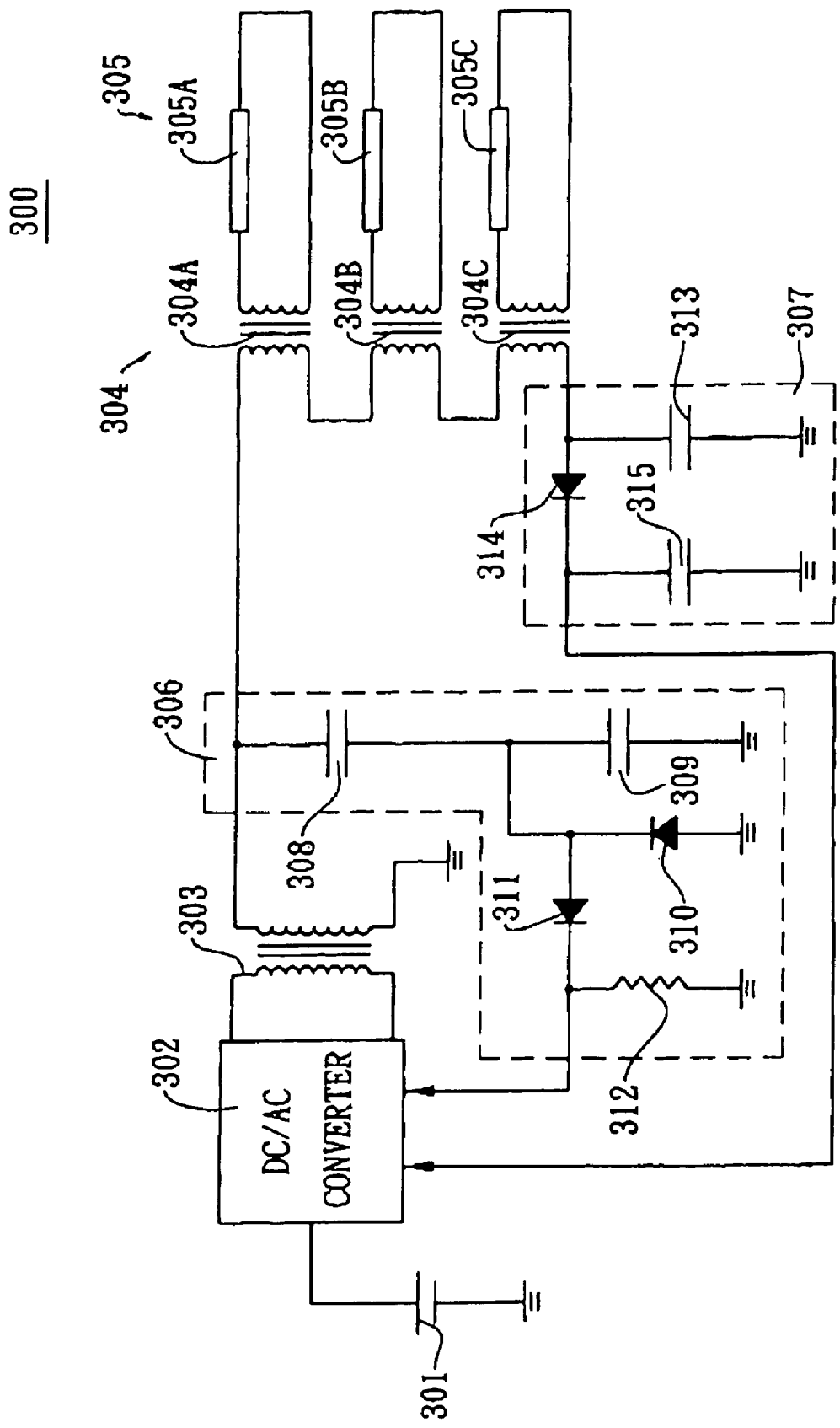
FIG. 3 is an exemplary circuit diagram of a multi-load driving system according to a first preferred embodiment of the present invention.

Referring to FIG. 3, an exemplary circuit diagram of a multi-load driving system 300 according to a first preferred embodiment of the present invention is illustrated. The multi-lamp driving system 300 includes a DC power supply 301, a DC/AC converter 302, a second-stage transformer 303, first-stage transformers 304, a plurality of lamp loads 305, a voltage detection circuit 306, and a current detection circuit 307. In this embodiment, the lamp loads are cold cathode fluorescent lamps (CCFLs).

According to the first preferred embodiment, the multi-load driving system 300 is embodied as an exemplary multi-lamp driving system. However, the present invention is to be broadly constructed to cover any particular load.

The DC power supply 301 is coupled to the input of the DC/AC converter 302. The output of the DC/AC converter 302 is coupled to a primary side of the second-stage transformer 303. The second-stage transformer 303 delivers a first-stage power source for the first-stage transformers 304. In this embodiment, the first-stage transformers 304 include three transformers 304A, 304B, 304C. The primary sides of the three transformers 304A, 304B, 304C are connected in series and the secondary sides thereof are coupled in series to CCFLs 305A, 305B, and 305C, respectively. Such DC/AC converter topologies include a full-bridge circuit, a half-bridge circuit, a push-pull circuit, and a Royer circuit, etc. According to the preferred embodiment of the present invention, the lamps 305A, 305B, and 305C are embodied as cold cathode fluorescent lamps (CCFLs). It is appreciated that the present invention is applicable to any type of load such as cold cathode fluorescent lamps, metal halide lamps, sodium vapor lamps, x-ray tubes, and External Electrode Fluorescent lamps.

The DC/AC converter 302 is employed to convert a DC power into an AC power which is stepped up by the second-stage transformer 303 and then delivered to the first-stage transformers 304. In other words, the second-stage transformer 303 performs the voltage step-up function and filtering function to provide a higher voltage to the first-stage transformers 304. The first-stage transformers 304 mainly performs the impedance-matching function to balance CCFL currents and deliver evenly distributed current to each CCFL in a multi-CCFL system so that each lamp provides approximately same amount of luminance.

In this first embodiment, the voltage detection circuit 306 includes two capacitors 308, and 309, two diodes 310, 311, and a resistor 312. The voltage detection circuit 306 detects the common node of the second-stage transformer 303 and the first-stage transformer 304A. As an overview, the system 300 depicted herein permits the voltage detection circuit 306 to be directly connected to the common node without requiring high voltage elements such as capacitors, diodes, etc because the voltage at the common node is lower than the output voltages of the first-stage transformers 304. Furthermore, the output voltages of the first-stage transformers 304 could be easily obtained by means of the voltage detection of the common node and the turn ratios of the first-stage transformers 304. In addition, the current detection circuit 307 includes a capacitor 313, a diode 314, and a resistor 315. The current detection circuit 307 is used to detect a primary-side current of the first-stage transformers 304. Hence the output currents of the first-stage transformers 304 could be easily obtained by means of the current detection of the primary-side current of the first-stage transformers 304 and the turn ratios of the first-stage transformers 304. Accordingly, the DC/AC converter adjusts the output current and output voltage based on the detected voltage and current.

Figure 4:
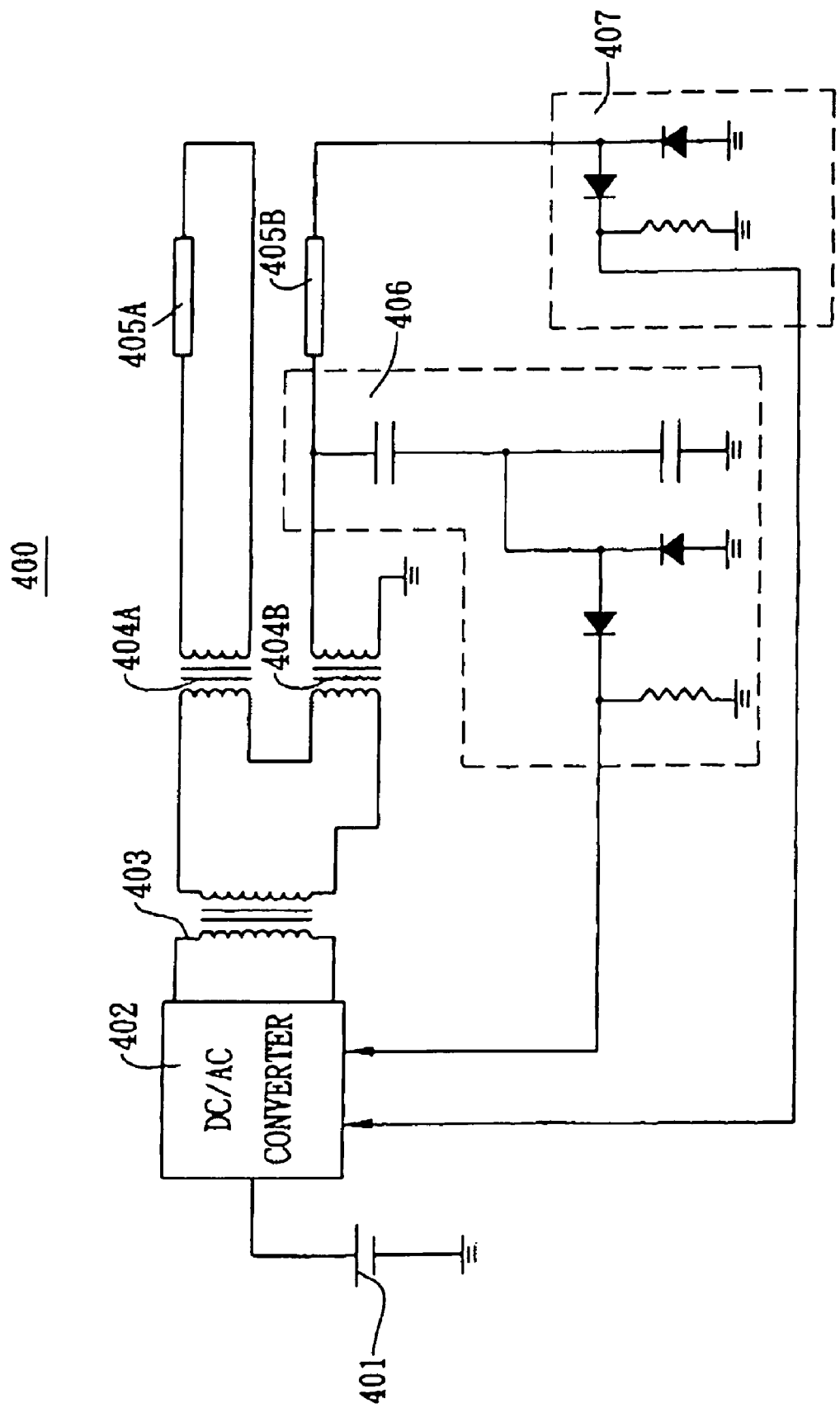
FIG. 4 is another exemplary circuit diagram of a multi-load driving system according to a second preferred embodiment of the present invention.

Referring to FIG. 4, another exemplary circuit diagram of a multi-load driving system 400 according to a second preferred embodiment of the present invention is illustrated. The multi-load driving system 400 includes a DC power supply 401, a DC/AC converter 402, a second-stage transformer 403, first-stage transformers 404, a plurality of lamp loads 405, a voltage detection circuit 406, and a current detection circuit 407. In this embodiment, the lamp loads are cold cathode fluorescent lamps (CCFLs). Operation of this second preferred embodiment is substantially to the same as that of the above first preferred embodiment. The main difference between the first preferred embodiment and the second preferred embodiment is that the voltage detection circuit 406 and the current detection circuit 407 are directly coupled to the cold cathode fluorescent lamp 405B so that the operation state of the first-stage transformers 404 could be directly obtained without estimating the lamp current and the voltage by means of the turn ratio of the first-stage transformers 404.

Figure 5:
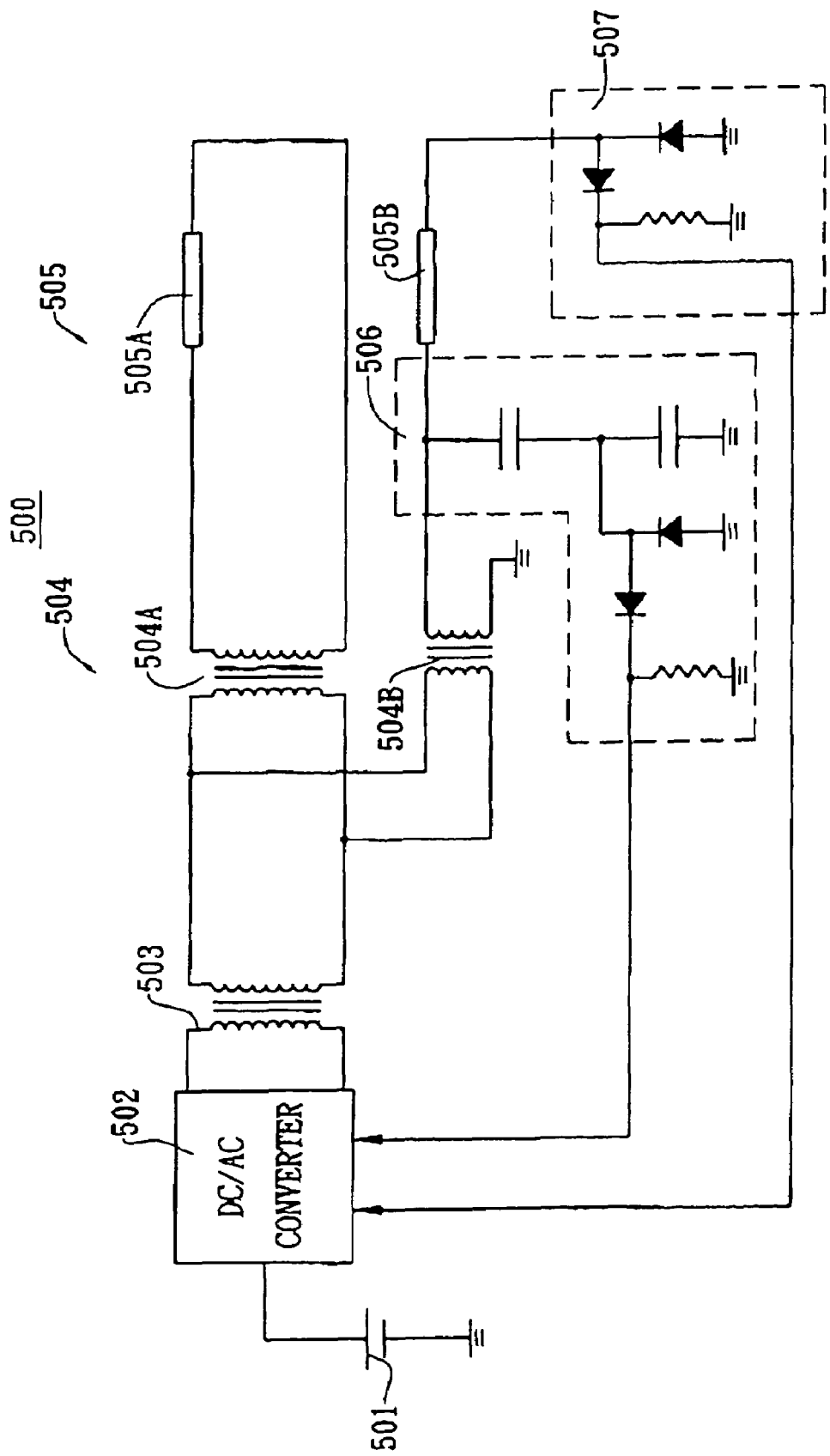
FIG. 5 is another exemplary circuit diagram of a multi-load driving system according to a third preferred embodiment of the present invention.

Referring to FIG. 5, another exemplary circuit diagram of a multi-load driving system 500 according to a third preferred embodiment of the present invention is illustrated. The multi-load driving system 500 includes a DC power supply 501, a DC/AC converter 502, a second-stage transformer 503, first-stage transformers 504, a plurality of lamp loads 505, a voltage detection circuit 506, and a current detection circuit 507. In (his embodiment, the lamp loads are cold cathode fluorescent lamps (CCFLs). Operation of this third preferred embodiment is substantially to the same as that of the above second preferred embodiment the main difference between the third preferred embodiment and the second preferred embodiment is that the primary sides of the first-stage transformers are connected in parallel to reduce the output voltage of the second-stage transformer, and the turn ratio of the second-stage transformer, and increase the efficiency.

Figure 6:
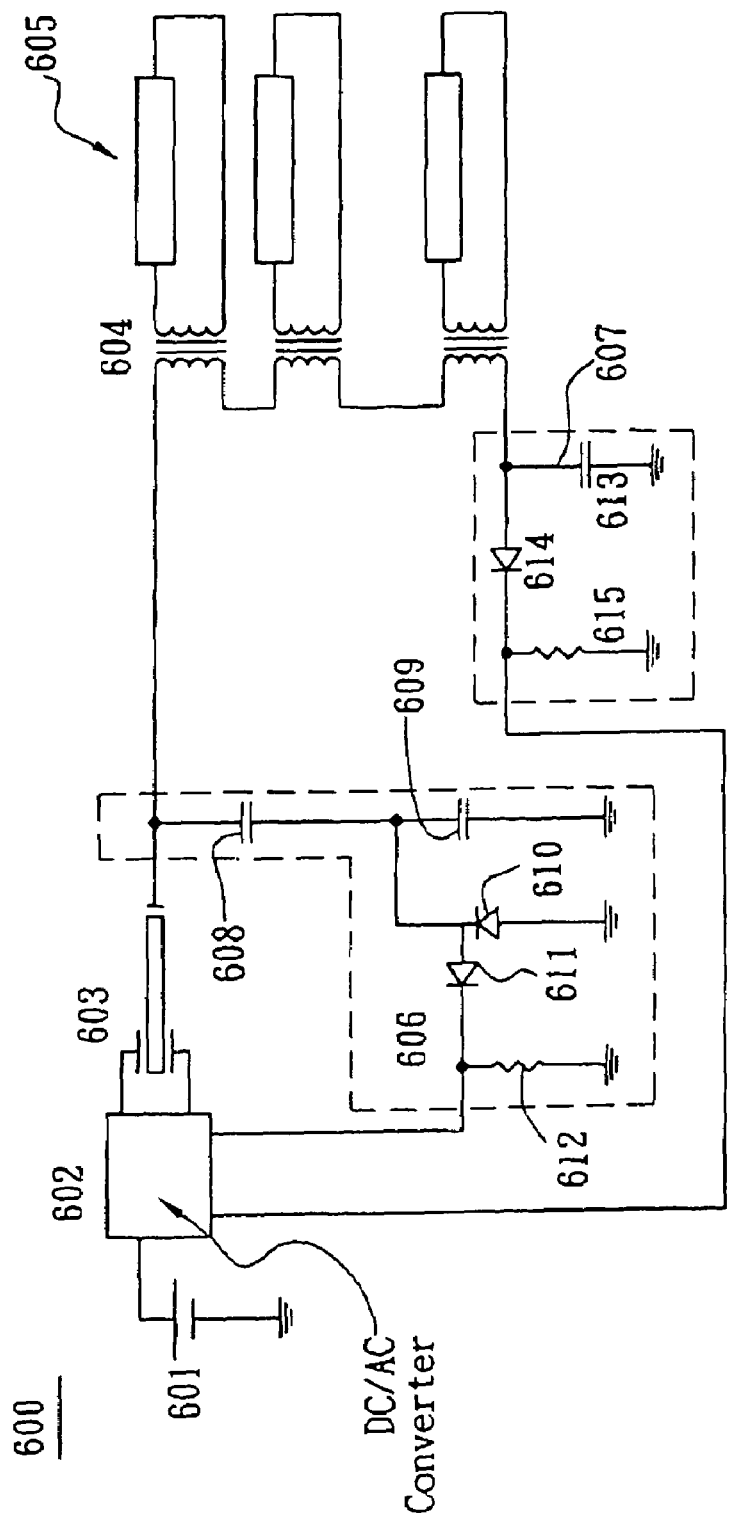
FIG. 6 is another exemplary circuit diagram of a multi-load driving system according to a fourth preferred embodiment of the present invention.

Referring to FIG. 6, another exemplary circuit diagram of a multi-load driving system 600 according to a fourth preferred embodiment of the present invention is illustrated. The multi-load driving system 600 includes a DC power supply 601, a DC/AC converter 602, a pizeo-transformer (PZT) 603, first-stage transformers 604, a plurality of lamp loads 605, a voltage detection circuit 606, and a current detection circuit 607. In this embodiment, the lamp loads are cold cathode fluorescent lamps (CCFLs). Operation of this fourth preferred embodiment is substantially to the same as that of the above second preferred embodiment. The main difference between die fourth preferred embodiment and the above preferred embodiments is that the second-stage transformer is a pizeo-transformer (PZT). The function of the pizeo-transformer (PZT) is like a step-up transformer.

One skilled in the art will understand that the embodiment of the present invention as shown in the drawings and described above is exemplary only and not intended to be limiting.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A multi-lamp driving system for driving a plurality of lamps, comprising:
   a power supply circuit, comprising a second stage transformer, for supplying said plurality of lamps with an AC power, wherein said power supply circuit comprises a DC/AC converter for converting a DC power to a first AC power, and said second-stage transformer is coupled to said DC/AC converter for stepping up said first AC power to provide said AC power;
   first-stage transformers coupled to said second stage transformer for performing an impedance-matching function to balance lamp currents and deliver evenly distributed current to each lamp in said multi-lamp system so that each lamp provides approximately same amount of luminance, wherein the first-stage transformers are voltage amplified transformers, and the second stage transformer and the first-stage transformers perform two-stage voltage amplifying; and
   a voltage detection circuit coupled to a common node of said second-stage transformer and said first-stage transformer for detecting a voltage of said common node.

2. The multi-lamp driving system, as recited in claim 1, further comprises a current detection circuit coupled to said first-stage transformer for detecting a primary-side current thereof.

3. The multi-lamp driving system, as recited in claim 1, wherein said lamps are selected from a group consisting of cold cathode fluorescent lamps, metal halide lamps, sodium vapor lamps, x-ray tubes, and External Electrode Fluorescent Lamps.

4. A multi-lamp driving system for driving a first and a second lamps, comprising:
   a power supply circuit for supplying said first and second lamps with an AC power;
   first-stage transformers coupled to said power supply circuit for performing an impedance-matching function to balance lamp currents and deliver evenly distributed current to each lamp in said multi-lamp system so that each lamp provides approximately same amount of luminance, wherein said first-stage transformers comprises:
   a first transformer having a primary side coupled to said power supply circuit and a secondary side directly coupled to a first two ends of said first lamp; and
   a second transformer having a primary side coupled to said first transformer and a secondary side directly coupled to a second two ends of said second lamp, wherein said primary side of said first transformer is coupled in series or parallel to said secondary side of said second transformer; and
   a voltage detection circuit coupled to a common node of said second-stage transformer and said first-stage transformer for detecting a voltage of said common node.

5. The multi-lamp driving system, as recited in claim 4, further comprises a current detection circuit coupled to said first-stage transformer for detecting a primary-side current thereof.

6. The multi-lamp driving system, as recited in claim 4, further comprises a current detection circuit coupled to said second lamp for detecting said second lamp current.

7. The multi-lamp driving system, as recited in claim 4, further comprises a current detection circuit coupled to said second lamp for detecting said second lamp current.

8. The multi-lamp driving system, as recited in claim 4, wherein said lamps are selected from a group consisting of cold cathode fluorescent lamps, metal halide lamps, sodium vapor lamps, x-ray tubes, and External Electrode Fluorescent Lamps.

9. A multi-lamp driving system for diving a first and a second lamps, comprising:
   a power supply circuit for supplying said first and second lamps with an AC power;
   first-stage transformers coupled to said power supply circuit for performing an impedance-matching function to balance lamp currents and deliver evenly distributed current to each lamp in said multi-lamp system so that each lamp provides approximately same amount of luminance, wherein said first-stage transformers comprises:
   a first transformer having a primary side coupled to said power supply circuit and a secondary side directly coupled to a first two ends of said first lamp; and
   a second transformer having a primary side coupled to said first transformer and a secondary side directly coupled to a second two ends of said second lamp, wherein said primary side of said first transformer is coupled in series to said secondary side of said second transformer; and
   a voltage detection circuit coupled to a common node of said secondary side of said first-stage transformer and said second lamp for detecting a voltage of said common node.

* * * * *